US012787996B2

(12) United States Patent
Carlson et al.

(10) Patent No.: US 12,787,996 B2
(45) Date of Patent: Nov. 10, 2026

(54) SYSTEM FOR A LINE LOCKING FISHING FLOAT

(71) Applicants: Edward Scott Carlson, Delmont, PA (US); Chuck Lanager, Greensburg, PA (US)

(72) Inventors: Edward Scott Carlson, Delmont, PA (US); Chuck Lanager, Greensburg, PA (US)

( * ) Notice: Subject to any disclaimer, the term of this patent is extended or adjusted under 35 U.S.C. 154(b) by 0 days.

(21) Appl. No.: 19/414,198

(22) Filed: Dec. 9, 2025

(65) Prior Publication Data

US 2026/0157359 A1 Jun. 11, 2026

Related U.S. Application Data

(60) Provisional application No. 63/730,063, filed on Dec. 10, 2024.

(51) Int. Cl.
*A01K 93/00* (2006.01)
*A01K 93/02* (2006.01)

(52) U.S. Cl.
CPC .............. *A01K 93/00* (2013.01); *A01K 93/02* (2013.01)

(58) Field of Classification Search
CPC ...................................................... A01K 93/00
USPC ......................................................... 43/44.91
See application file for complete search history.

(56) References Cited

U.S. PATENT DOCUMENTS

| | | | | | |
|---|---|---|---|---|---|
| 2,208,240 | A * | 7/1940 | Arnesen | A01K 93/00 43/44.88 |
| 5,377,444 | A * | 1/1995 | Gibney, Sr. | A01K 93/00 43/44.91 |
| 7,415,792 | B1 | 8/2008 | Noble | |
| 7,797,877 | B1 * | 9/2010 | Bennis | A01K 91/03 43/44.87 |
| 7,877,924 | B2 | 2/2011 | Schoenike | |
| 8,276,311 | B2 * | 10/2012 | Cowin | A01K 91/03 43/44.87 |
| 11,997,997 | B2 | 6/2024 | Keeling | |
| 12,137,678 | B2 | 11/2024 | Douglas | |
| 2006/0248780 | A1 * | 11/2006 | Elliott | A01K 93/00 43/44.9 |
| 2010/0058643 | A1 * | 3/2010 | Morris | A01K 97/02 43/17.5 |
| 2012/0023807 | A1 * | 2/2012 | Schoenike | A01K 93/00 29/428 |
| 2019/0373879 | A1 * | 12/2019 | VanAusdal | A01K 97/06 |
| 2021/0378220 | A1 * | 12/2021 | Wedam | A01K 85/18 |

(Continued)

FOREIGN PATENT DOCUMENTS

| | | | | |
|---|---|---|---|---|
| CN | 120036289 A * | 5/2025 | A01K 95/00 |
| GB | 2263218 A * | 7/1993 | A01K 93/00 |
| WO | WO-2016126106 A1 * | 8/2016 | A01K 93/02 |

*Primary Examiner* — Christopher P Ellis
(74) *Attorney, Agent, or Firm* — Wei Yu; Dentons Cohen & Grigsby, P.C.

(57) ABSTRACT

The present invention provides a slotted or non-slotted floating locking device that includes two internal components (chassis) that thread together in the opposite direction adjacent an internal central locking mechanism that includes a tapered compressing closing section and a receiving tapered opening (male and female) that can lock the device at a desired location on a fishing line. The two internal components are configured to receive slotted or non-slotted exterior components which provides buoyancy.

15 Claims, 19 Drawing Sheets

(56) References Cited

U.S. PATENT DOCUMENTS

| | | | | |
|---|---|---|---|---|
| 2023/0075869 | A1 * | 3/2023 | Knickrehm | A01K 87/008 |
| 2024/0065245 | A1 * | 2/2024 | Carlson | A01K 91/047 |
| 2024/0334919 | A1 * | 10/2024 | Douglas | A01K 93/00 |

* cited by examiner

SYSTEM FOR A LINE LOCKING FISHING FLOAT

CROSS-REFERENCE TO RELATED APPLICATIONS

This application claims the benefit of priority under 35 U.S.C. § 120 of U.S. Provisional Application Ser. No. 63/730,063 filed on Dec. 10, 2024, entitled Adjustable Locking Device, the content of which is relied upon and incorporated herein by reference in its entirety.

BACKGROUND

Recreational fishing is enjoyed by people of all ages and skill levels-from young beginners using simple bobbers to seasoned anglers using specialized floats in professional tournaments. Regardless of the type of fishing, the float serves a common purpose: suspending bait at a specific depth and signaling a fish strike.

Over the years, many float designs have emerged for different fishing applications. Small strike indicators are used for fly or pan fishing, round bobbers for general freshwater use, popping corks for saltwater, catfish floats for heavy rigs, and large shark floats for deep-water or offshore fishing. While their sizes and shapes vary, most conventional floats share one limitation: they require knots, clips, pegs, or springs to attach to the line.

These mechanisms make setup and depth adjustment time-consuming and cumbersome. They can also weaken the line at the knot or result in lost components-such as pegs or detachable halves-that render the float useless. Adjusting bait depth often requires re-rigging, removing the float, or tying new knots, which interrupts the fishing process and shortens the time the bait is actually in the water. For older fishermen or those with reduced dexterity, these operations can be especially difficult.

SUMMARY

The following summary is provided to introduce a selection of concepts in a simplified form that are further described below in the detailed description. This summary is not intended to identify key features or essential features of the claimed subject matter, nor is it intended to be used to limit the scope of the claimed subject matter.

The present invention comprises a two-part line locking device that includes a centrally located aperture in order to receive a fishing line. It consists of a male component with at least two centrally located protruding tapered prongs and an internal recessed encircling threaded opening, and a protruding centrally located internal receiving female opening tapered component that includes external threads. When the components are rotated and simultaneously threaded together in the opposite direction the prongs of the male compression member compress and lock onto a fishing line when inserted into the tapered mated female compression member and then tightened.

These and other features and advantages will be apparent from a reading of the following detailed description and a review of the appended drawings. It is to be understood that the foregoing summary, the following detailed description and the appended drawings are explanatory only and are not restrictive of various aspects as claimed.

DETAILED DESCRIPTION

Figure 1:
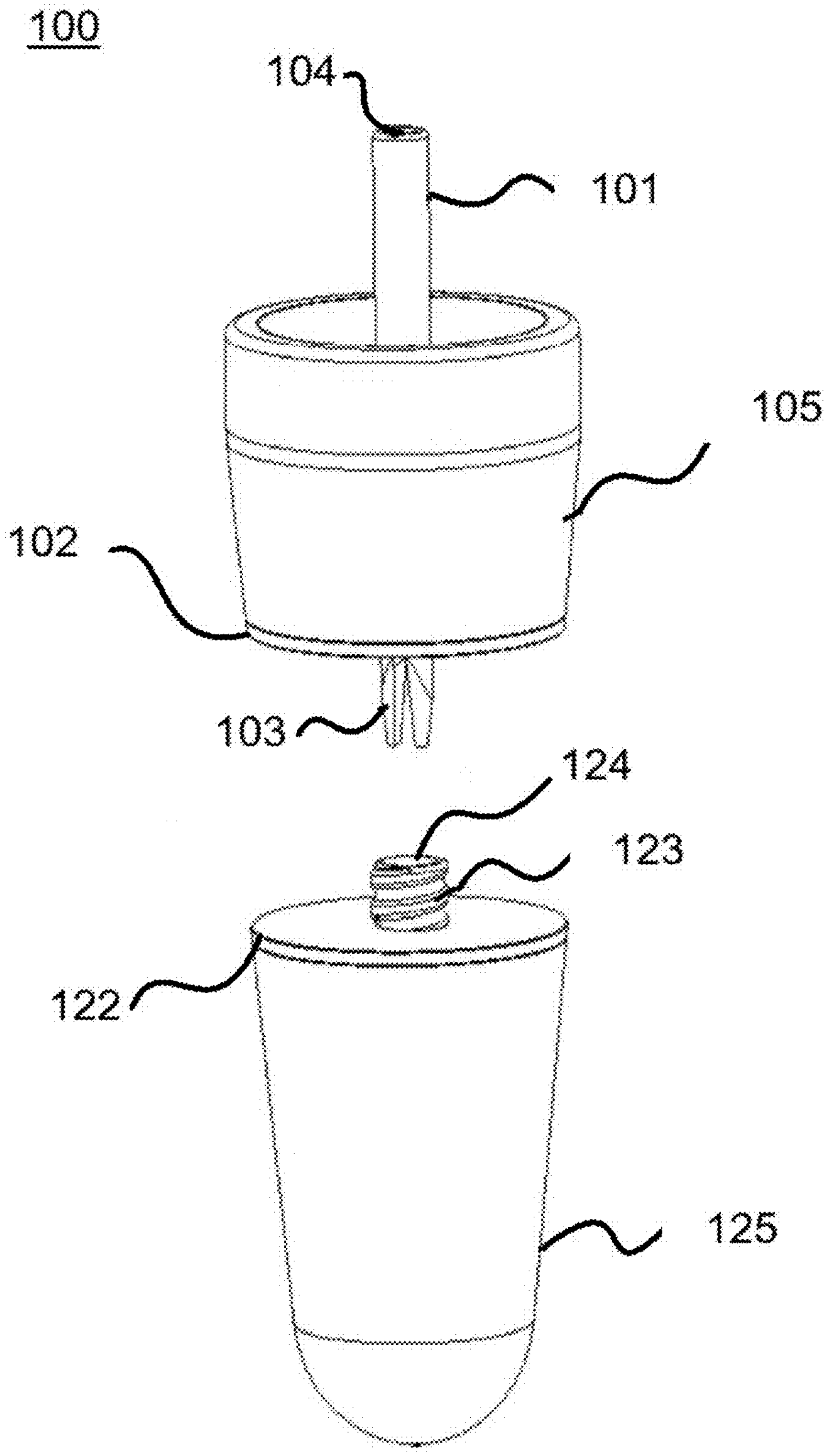
FIG. 1 is a perspective view of a fishing float in accordance with one embodiment of the present invention, showing the two-part body construction.

The detailed description provided below in connection with the appended drawings is intended as a description of examples and is not intended to represent the only forms in which the present examples can be constructed or utilized. The description sets forth functions of the examples and sequences of steps for constructing and operating the examples. However, the same or equivalent functions and sequences can be accomplished by different examples.

The following description sets forth illustrative embodiments of integrated systems, devices, and methods that relate to a two-part locking device, particularly for fishing floats. More specifically, it provides a mechanism for easily attaching and adjusting the float's position on a fishing line without requiring knots. It also enables the easy adjustment of the depth of a bait attached to a fishing line, and it can also lock onto a line for height or length adjustments of other objects.

The present invention provides a fishing float that can be installed after the fishing rig is already set up. The float includes an elongated slot that allows the fishing line to be easily positioned into the center of the float, followed by a simple opposing twist of the two halves to lock it securely onto the line at any location. No knots, clips, spings, or pegs are required. The locking system holds the float firmly during casting and retrieval yet allows instant, precise adjustment of bait depth when desired.

This capability saves time and effort, keeping the bait in the water longer, improving catch potential, and providing a competitive advantage in tournament fishing. Furthermore, the locking mechanism's adaptability across all float sizes-from tiny strike indicators to large shark floats-creates an entirely new class of fishing floats. The modular, two-part design enables customization of colors, shapes, and buoyancies, and the absence of fragile or detachable components makes the float more durable and reliable than traditional designs.

The result is a universal, user-friendly, and time-efficient float system that improves performance and accessibility for all anglers, regardless of age, ability, or fishing environment.

It is an objective of the present invention to provide a two-part slotted fishing float that includes two internal components (chassis) that thread together in the opposite direction adjacent an internal central locking mechanism that includes a tapered compressing closing section and a tapered receiving opening (male and female) that can lock the float at a desired location/position on a fishing line.

It is an objective of the present invention to provide slotted or non-slotted exterior buoyant components that are adhered (glued) to the two internal components. The exterior buoyant components may be attached through friction fit or threaded means.

It is an objective of the present invention to provide chassis components where the mating halves are substantially flat. This is referring to the centrally located circular plates or discs.

It is an objective of the present invention to provide chassis components where the mating halves include a raised internal peripheral closing ring which enhances the appearance, by closing a gap produced by different diameter line, and aids in keep small amounts of water out of the center of the device.

It is an objective of the present invention to provide chassis components where the mating halves include a raised external peripheral ring in order to create a pocket in order to receive a foam component.

It is an objective of the present invention to provide chassis components that include no raised rings, or, one or more raised rings.

It is an objective of the present invention to provide chassis mating halves that include circular, square, triangular, etc. shapes.

It is an objective of the present invention to provide chassis mating halves that are smaller or larger in diameter than the adhered foam halves.

It is an objective of the present invention to provide foam halves that include indentations that can be any shape in order to receive the chassis half. This will/could prevents the foam halves from rotating relative to the chassis halves thus eliminating the need for the chassis fins. Foam halves can also be flat surfaced.

It is an objective of the present invention to provide foam halves that include over hanging radial lips.

It is an objective of the present invention to provide chassis halves that exclude elongated stems, or, include one or more stems. It is envisioned that the present invention could have only a top stem, only a bottom stem, or, stem on top and bottom. Stems can be the same length or different lengths. Stems could be different shapes, such as round, square, triangular, etc.

It is an objective of the present invention to provide attached buoyant component(s) only on top, only on bottom and/or on top and bottom.

It is an objective of the present invention to provide buoyant components that include various (any) shape(s) such as oval, hemispherical, conical, pyramidical, or combinations thereof. See attached drawing.

It is an objective of the present invention to provide foam components that include centrally located stems (built-in) that are separate from the chassis.

It is an objective of the present invention to provide a line locking float that include or exclude weight(s).

It is an objective of the present invention to provide a line locking float that include or exclude the fins or wings on the chassis. Fins stop the foam from rotating/slipping relative to the chassis. If an adequate adhesive is used the fins may not be needed at all. One or more fins that can be made into various shapes, such as triangular, quarter circle, etc.

It is an objective of the present invention to provide slotted endcaps that are positioned onto/over the slotted stems, so that when rotated prevent the line from coming out of the center of the float.

It is an objective of the present invention to provide a float kit that includes various weighted bottoms so different depths can be achieved. The kit may include various size/shaped halves, such as a hemispherical top and oval bottom to form a teardrop shaped float. The kit may comprise parts with different sizes, lengths, and colors.

It is an objective of the present invention to provide a rubber like coating on the inside of the male prongs (figure not shown) in order to prevent slipping of the line. The present invention may comprise components to protect the line from kinks and ensure gripping.

It is an objective of the present invention to provide one or more line locking devices (on opposing ends), and/or only one on the top or one on the bottom on a fishing line and place various shaped slip floats, beads and weights in between creating a fishing float arrangement. This arrangement can be spaced at different distances and locations on the line.

It is an objective of the present invention to provide a slotted foam half (friction fit) that rotates around the slotted stem in order to close the gap in the slot and keep the line in the center.

It is an objective of the present invention to provide the line lock float to lock onto a rigid non-flexible line such as a steel rod.

It is an objective of the present invention to provide devices that floats on top of the water, at various depths in the water or even one that sinks to the bottom.

It is an objective of the present invention to provide a float wherein the tapered male prongs and female tapered component extends to end, or almost to the end, of their respective center passages in order to prevent the line from coming out. The male prongs and/or the female components may extend out of the body of the float.

References to "one embodiment," "an embodiment," "an example embodiment," "one implementation," "an implementation," "one example," "an example" and the like, indicate that the described embodiment, implementation or example can include a particular feature, structure or characteristic, but every embodiment, implementation or example can not necessarily include the particular feature, structure or characteristic. Moreover, such phrases are not necessarily referring to the same embodiment, implementation or example. Further, when a particular feature, structure or characteristic is described in connection with an embodiment, implementation or example, it is to be appreciated that such feature, structure or characteristic can be implemented in connection with other embodiments, implementations or examples whether or not explicitly described.

The terminology used herein is for the purpose of describing particular examples only and is not intended to be limiting. As used herein, the singular forms "a," "an," and "the" may be intended to include the plural forms as well, unless the context clearly dictates otherwise. As example, "a" vent may include multiple vents, and the like.

As used herein, the term "and/or" includes any and all combinations of one or more of the associated listed items. Likewise, as used herein, a term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances.

Words such as "then," "next," etc. are not intended to limit the order of the steps; these words are simply used to guide the reader through the description of the methods.

The terms "comprises", "comprising", "including", "having", and "characterized by", may be inclusive and therefore specify the presence of stated features, elements, compositions, steps, integers, operations, and/or components, but do not preclude the presence or addition of one or more other features, integers, steps, operations, elements, components, and/or groups thereof. Although these open-ended terms may be to be understood as a non-restrictive term used to describe and claim various aspects set forth herein, in certain aspects, the term may alternatively be understood to instead be a more limiting and restrictive term, such as "consisting of" or "consisting essentially of." Thus, for any given embodiment reciting compositions, materials, components, elements, features, integers, operations, and/or process steps, described herein also specifically includes embodiments consisting of, or consisting essentially of, such recited compositions, materials, components, elements, features, integers, operations, and/or process steps. In the case of "consisting of", the alternative embodiment excludes any additional compositions, materials, components, elements, features, integers, operations, and/or process steps, while in the case of "consisting essentially of", any additional compositions, materials, components, elements, features, integers, operations, and/or process steps that materially affect the basic and novel characteristics may be excluded from such an embodiment, but any compositions, materials, components, elements, features, integers, operations, and/or process steps that do not materially affect the basic and novel characteristics may be included in the embodiment.

Any method steps, processes, and operations described herein may not be construed as necessarily requiring their performance in the particular order discussed or illustrated, unless specifically identified as an order of performance. It is also understood that additional or alternative steps may be employed, unless otherwise indicated.

In addition, features described with respect to certain example embodiments may be combined in or with various other example embodiments in any permutational or combinatory manner. Different aspects or elements of example embodiments, as disclosed herein, may be combined in a similar manner. The term "combination," "combinatory," or "combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included may be combinations that contain repeats of one or more item or term, such as BB, AAA, AB, BBC, AAABCCCC, CBBAAA, CABABB, and so forth. The skilled artisan will understand that typically there is no limit on the number of items or terms in any combination, unless otherwise apparent from the context.

While specific aspects of the disclosure have been provided hereinabove, the disclosure may, however, be embodied in many different forms and should not be construed as necessarily being limited to only the embodiments disclosed herein. Rather, these embodiments may be provided so that this disclosure is thorough and complete, and fully conveys various concepts of this disclosure to skilled artisans.

All numerical quantities stated herein may be approximate, unless stated otherwise. Accordingly, the term "about" may be inferred when not expressly stated. The numerical quantities disclosed herein may be to be understood as not being strictly limited to the exact numerical values recited. Instead, unless stated otherwise, each numerical value stated herein is intended to mean both the recited value and a functionally equivalent range surrounding that value. At the very least, and not as an attempt to limit the application of the doctrine of equivalents to the scope of the claims, each numerical value should at least be construed in light of the number of reported significant digits and by applying ordinary rounding processes. Typical exemplary degrees of error may be within 20%, 10%, or 5% of a given value or range of values. Alternatively, the term "about" refers to values within an order of magnitude, potentially within 5-fold or 2-fold of a given value. Notwithstanding the approximations of numerical quantities stated herein, the numerical quantities described in specific examples of actual measured values may be reported as precisely as possible. Any numerical values, however, inherently contain certain errors necessarily resulting from the standard deviation found in their respective testing measurements.

All numerical ranges stated herein include all sub-ranges subsumed therein. For example, a range of "1 to 10" or "1-10" is intended to include all sub-ranges between and including the recited minimum value of 1 and the recited maximum value of 10 because the disclosed numerical ranges may be continuous and include every value between the minimum and maximum values. Any maximum numerical limitation recited herein is intended to include all second numerical limitations. Any minimum numerical limitation recited herein is intended to include all higher numerical limitations.

Features or functionality described with respect to certain example embodiments may be combined and sub-combined in and/or with various other example embodiments. Also, different aspects and/or elements of example embodiments, as disclosed herein, may be combined and sub-combined in a similar manner as well. Further, some example embodiments, whether individually and/or collectively, may be components of a larger system, wherein other procedures may take precedence over and/or otherwise modify their application. Additionally, a number of steps may be required before, after, and/or concurrently with example embodiments, as disclosed herein. Note that any and/or all methods and/or processes, at least as disclosed herein, may be at least partially performed via at least one entity or actor in any manner.

While particular aspects have been illustrated and described, it would be obvious to those skilled in the art that various other changes and modifications may be made without departing from the spirit and scope of the invention. Those skilled in the art will recognize or be able to ascertain using no more than routine experimentation, numerous equivalents to the specific apparatuses and methods described herein, including alternatives, variants, additions, deletions, modifications and substitutions. This application including the appended claims is therefore intended to cover all such changes and modifications that may be within the scope of this application.

Unless defined otherwise, all technical and scientific terms used herein have the same meanings as commonly understood by one of ordinary skill in the art.

Numerous specific details are set forth to provide a thorough understanding of one or more embodiments of the described subject matter. It is to be appreciated, however, that such embodiments can be practiced without these specific details.

The present invention provides a universally adaptable, adjustable fishing float designed to be installed and repositioned on a fishing line instantly and without the use of knots, clips, pegs, or springs. The float system introduces a simplified method of securing the float to the line through a slot-accessible/or non-slotted internal passage and a manual locking action that fixes the float at any selected location along the line.

In one embodiment, the fishing float comprises a two-part body assembly, which may be generally spherical, oval, cylindrical, or elongated depending on the intended fishing application. Each body portion includes an interior passage or channel which, when the two portions are joined, defines a central passageway for receiving a fishing line.

An elongated slot extends radially from the exterior of the float body to the central passageway, permitting lateral insertion of the fishing line into the float after the line has already been rigged with terminal tackle, such as hooks, weights, and swivels. This feature eliminates the need to thread the line through a fixed eyelet or opening, enabling the float to be installed or removed at any time during the fishing process.

The two body portions are configured to interlock through a manual twisting motion. When rotated in opposite directions, the body portions engage and apply a compressive and/or frictional force that secures the fishing line within the central passageway at a desired location. The locking mechanism may include complementary mating features such as threads, tabs, ridges, detents, or frictional surfaces that achieve secure retention of the fishing line without the use of external hardware.

The float can be constructed from lightweight, buoyant materials such as expanded or molded polymers, cork, foam, wood, nylon, or hollow plastic shells. Certain embodiments may incorporate an internal, external, or both, weighting element to enhance casting distance, maintain vertical stability, or achieve specific buoyancy characteristics. The weighting elements may be constructed of metal and their respective alloys, such as steel, aluminum, lead, brass and tungsten.

A key advantage of the invention is that the underlying locking and attachment principle can be applied to all float sizes and styles. For example, a small embodiment may serve as a strike indicator for panfish or trout, while larger versions may be used for catfish, saltwater species, or even offshore shark fishing. Regardless of size or configuration, the locking system functions consistently, making the invention suitable for a complete product line of floats sharing a common operational principle.

In certain embodiments, the float's two body portions may be interchangeable, allowing users to mix and match different shapes, colors, and buoyancies. This modularity enables the creation of float kits that include multiple body types that can be assembled in various combinations to suit individual preferences or environmental conditions.

The float may also be produced in both weighted and non-weighted versions, and multiple floats may be installed on a single fishing line to create combination or slip-float arrangements. The system can also accommodate beads, stoppers, or sinkers positioned between floats to create different presentations or improve casting performance.

The float mechanism is universally adaptable across a wide range of float sizes and styles, from the smallest strike indicators to the largest offshore and shark floats. This scalability establishes an entirely new class of fishing floats that share a common locking technology while serving diverse fishing applications.

In addition to its functional benefits, the invention features a modular, two-part construction that allows for interchangeable float bodies in various colors, shapes, and buoyancies. The floats may be weighted or non-weighted and may be combined on a single fishing line to create multi-float or slip-float configurations.

Overall, the invention provides an ergonomic, reliable, and time-efficient float system that improves both the usability and performance of traditional fishing gear.

Referring to FIG. 1, an exploded perspective view of one embodiment of the present invention is indicated by 100 in general. There are two main parts of the float assembly 100: the first housing 105 and the second housing 125, which for use will be fastened together using the threaded portion 123.

The threaded portion 123 may be threaded into a threaded receptacle/cavity in the first housing 105. The first housing 105 may comprise a body with a chassis 101, a disc 102, and a compression member 103. The chassis 101 may comprise a central passage 104 through its length, wherein a line may be passed therein from its opening to outwards from the compression member 103. The compression member 103 may comprise a plurality of prongs. In this example, the prongs are shown to be 2, but the compression member 103 may be adapted to have any number of prongs. The compression member 103 may be situated in a cavity, which may be seen in other views of the line locking float 100. In various examples, the cavity may comprise a threaded portion, wherein it may serve as a receptacle to a threaded piece.

The second housing 125 may comprise a body with a second disc 122, with a threaded portion 123 protruding. The threaded portion 123 may comprise a cavity 124, through which the compression member 103 may be inserted. The cavity 124 may be tapered, such that when the compression member 103 moves deeper inwards, the prongs may be caused to compress together. Furthermore, the threaded portion 123 may be threaded into the cavity in the first housing 105, such that the compression member 103 may be brought deeper into the second cavity 124.

When assembled, the compression member 103 may insert into the center cavity 124 of the threaded portion 123. As the threaded portion 123 moves upwards into the first housing 125, the compression member 103 compresses inwards. This interaction may cause the compression member to securely fasten around a fishing line that has passed through the central passage formed by the first cavity 104 and second cavity 124.

In an example, the interior of the compression member 103 may be constructed to have non-flat surfaces, such that textured surface may be provided on the inside facing surfaces of the prongs. This design and construction may enable the compression member to have better grip on the line, thereby facilitating better line management faced by various conventional fishing floats and bobbers. In various examples, a frictional surface may be installed on the interior of the compression member to further assist with better grips with the lines.

The assembly is configured for a fishing line to be threaded up or down through the axial tube apertures in the first cavity 104 and second cavity 124. Once in the desired position on the fishing line, the two parts are tightened further so that the male compression portion 26 locks onto the line.

Figure 2:
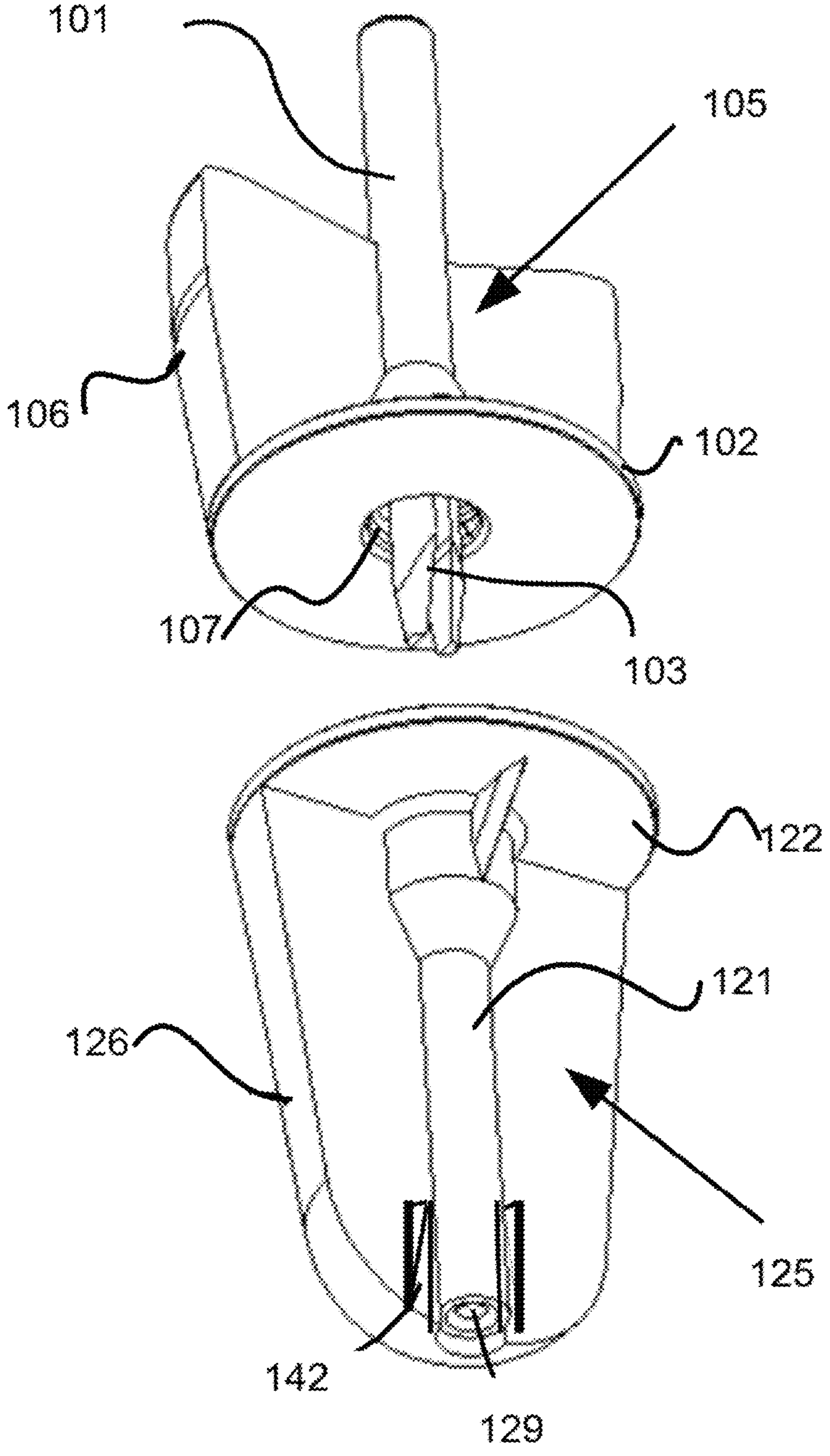
FIG. 2 is a sectional perspective view of the line locking float in accordance with subject disclosure.

FIG. 2 is a sectional perspective view of separated body parts of the present invention showing the internal parts or chassis. The first chassis 101 and the second chassis 121 are shown to be contained with the first housing 105 and the second housing 125 respectively. The first housing 105 may comprise a body 106 formed around the first chassis 101. Included in the first chassis 101 are a stem (or tubular portion) that connects to the prongs of the compression member 103. The stem of the first chassis 101 may stick out of the first housing body 106. The chassis 101 may comprise a first disc 107 formed around the compression member 103. In an example, a cavity 107 may be provided, recessing into the first disc 102, such that a threaded surface is provided around the cavity 107. A threaded portion 123 may thus be threaded into the cavity, such that the compression member may be inserted into a corresponding tapered cavity 124.

The second housing 125 may comprise a second body 126 formed around the second chassis 121. Included in the second chassis 121 are a stem (or tubular portion) that connects to the threaded portion 123, above the second disc 122.

The second chassis 121 may comprise a weight 142 founded around its distal end. The second chassis may comprise a bottom aperture 129 through which a fishing line may be fed in or pulled through. The bottom aperture 129 may be aligned with an opening of the stem in the first chassis 101, aligned through center of the compression member 103, such that the fishing line may be threaded through a center line defined by the tubular portion first chassis 101 and second chassis 121.

Figure 3:
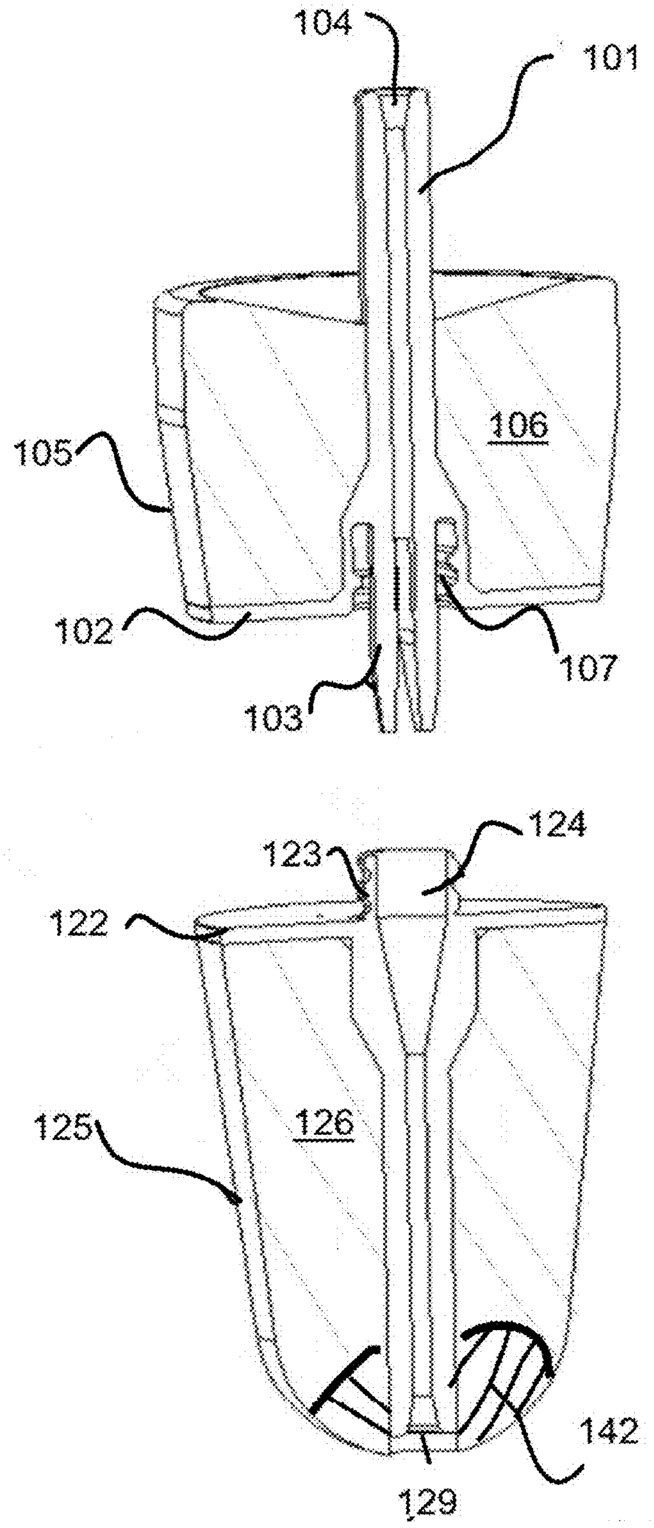
FIG. 3 is another sectional perspective view of the line locking float in accordance with subject disclosure.

FIG. 3 is another perspective sectional view of the line locking floatc 100. In this example, the first housing body 106 and the second housing body 126 may be constructed of foam for flotation. A bottom weight 142 may be provided to keep the float assembly upright when it is cast into water. As can be seen in this sectional view, the first housing 105 may comprise a foam body 106 that is attached to the tubular portion of the first chassis 101 of the line locking float 100. A center passage 104 may be provided through the tubular portion of the first chassis 101, wherein a fishing line may be fed through. In this example, the male compression member 103 originates from a recessed cavity 107 on the first housing 105 and extends below the first disc 102 with a plurality of prongs. A threaded surface may be provided along an inner surface of the recessed cavity 107. Thus, the threaded portion 123 may be threaded into the threaded surface 107, thereby maintaining connection between the first housing 105 and the second housing 125.

Figure 4:
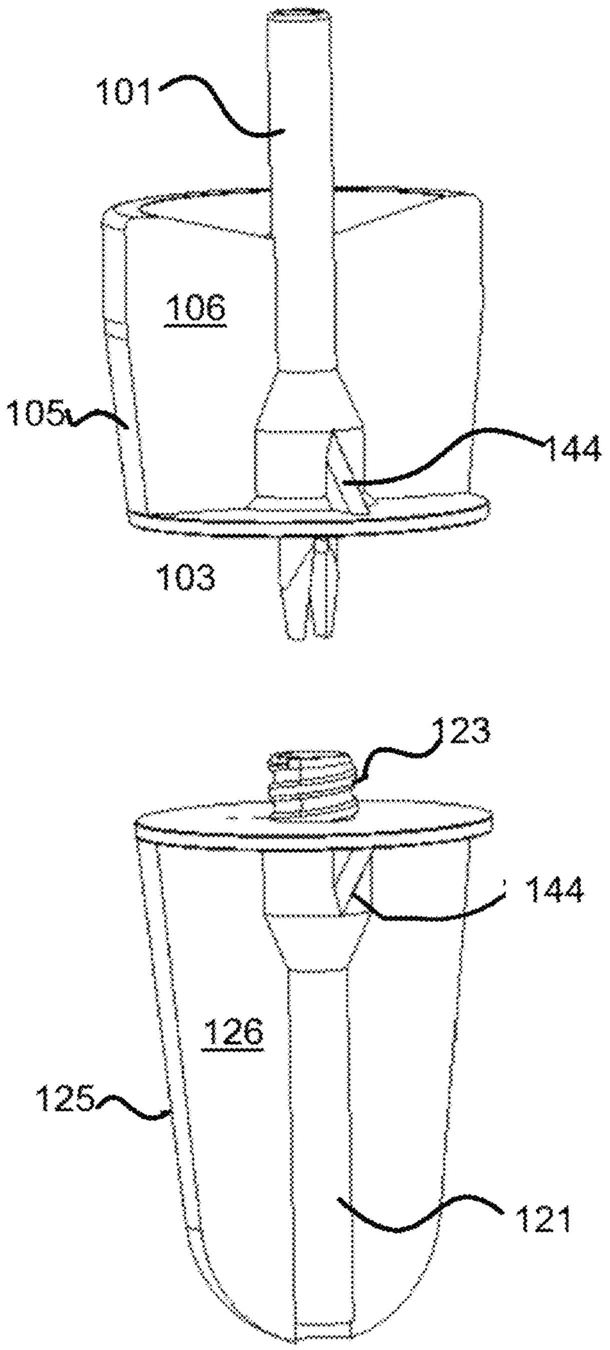
FIG. 4 is a perspective view of the line locking float with at least a fin in accordance with subject disclosure.

FIG. 4 is an alternative perspective view, partly in section. In this view, at least one fin 144 is allocated on the first housing 105 and second housing 125. In this example, the first foam body 106 may be configured around the at least one fin 144. In an example, the first foam body 106 may be formed around the fin 144, such as molded around the fin 144, such that the first housing 105 may be rotated by the first foam body 106 effectively. The at least one fin 144 may the first foam body 106 may be configured around the at least one fin 144. In an example, the second foam body 126 may be formed around the fin 144, such as molded around the fin 144, such that the second housing 125 may be rotated by the second foam body 126 effectively. The at least one fin 144 may ensure the second foam body 126 securely attaches to second chassis 121.

Figure 5:
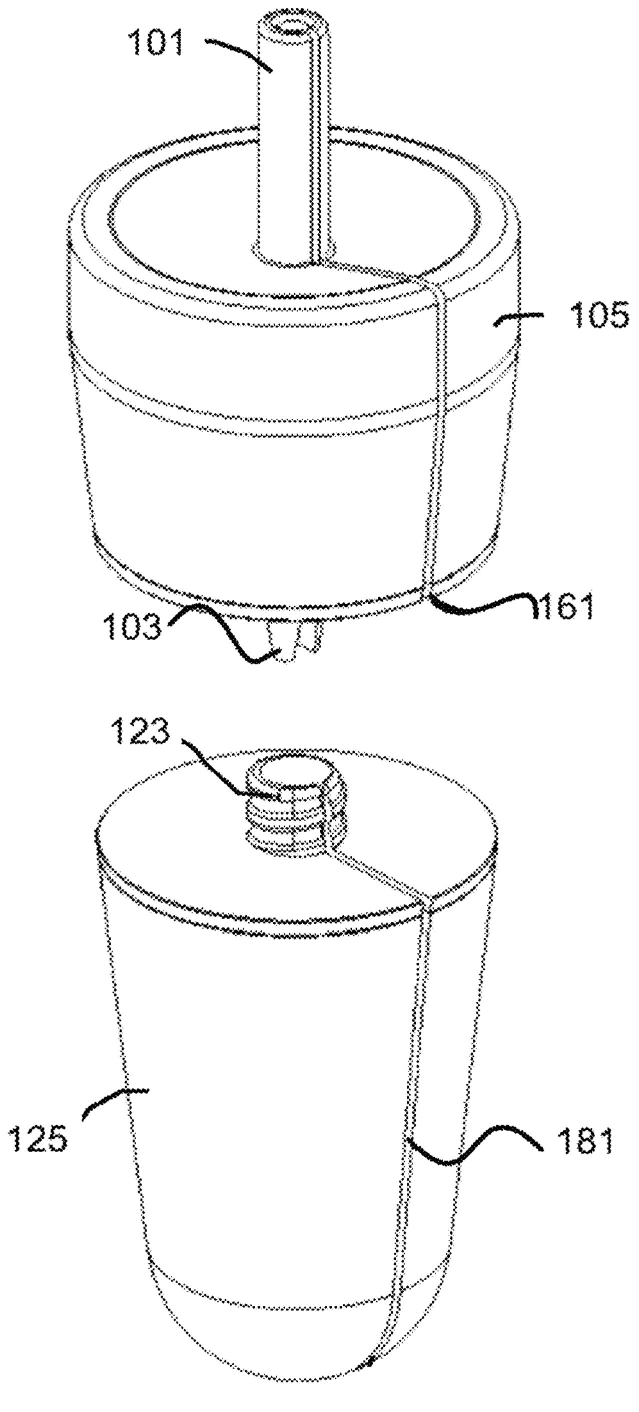
FIG. 5 is a perspective view of an embodiment of the line locking float with an elongated aperture for line insertion in accordance with subject disclosure.

FIG. 5 provides a perspective view of an embodiment illustrating an optional feature of first aperture 161 through the first housing 105 and second aperture 181 through the second housing 125. In an example, the first aperture 161 and the second aperture 181 may extended into the chassis into the center of the tubular portions of the fist chassis 101 and second chassis 121. This permits the fishing line to be positioned into the center of the float after the first housing 105 has already been threaded onto the second housing 125, wherein the threaded member 123 have already caused the compression member 103 to enter into its second cavity 124.

As such, the line may enter through the first aperture 161 and second aperture 181 and allow the line locking float 100 to be placed thereon directly, such that the line may reside within the central passage defined by the tubular portion of the first chassis 101 and the central passage 124 of the threaded portion 123. Subsequently, the first housing 105 may further thread onto the second housing 125, while the line is within the center of the first chassis 101 and the threaded member 123 of the second chassis 121, such that the male compression member 103 may further tighten around the fishing line. This configuration allows a user to attach and remove the line locking float 100 without having to handle both the first housing 105 and the second housing 125 separately. By allowing the user to attach a pre-assembled line locking float onto the line directly, the line locking float improves ease of use in all weather conditions.

Figure 6:
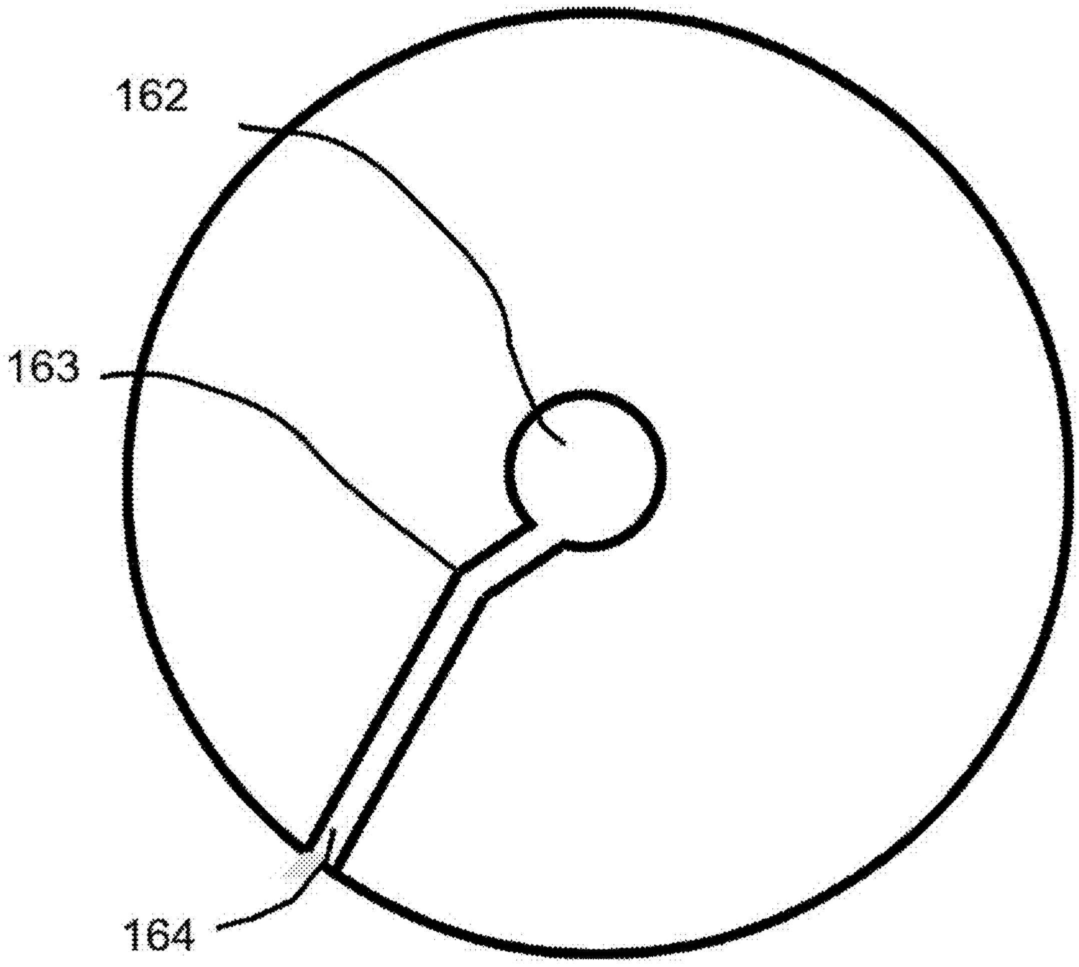
FIG. 6 is a top view of a housing with an aperture for the line locking float in accordance with subject disclosure.

FIG. 6 provides a top cross-sectional detail view of an embodiment of FIG. 5. An aperture, such as the first aperture 161 in FIG. 5, may be designed to comprise an elbow bend 163 near the center tube 162 so as to inhibit the fishing line from slipping out of the housings. Therefore, the fishing line may enter into the body of the line locking float at a different angle from the aperture opening 164, than a direct path to the center passage 162, thereby providing additional fixed stability before the line locking float is fully tightened. In other examples, the first aperture 161 may be designed to follow a straight path to the central passage without any bends.

Figure 7:
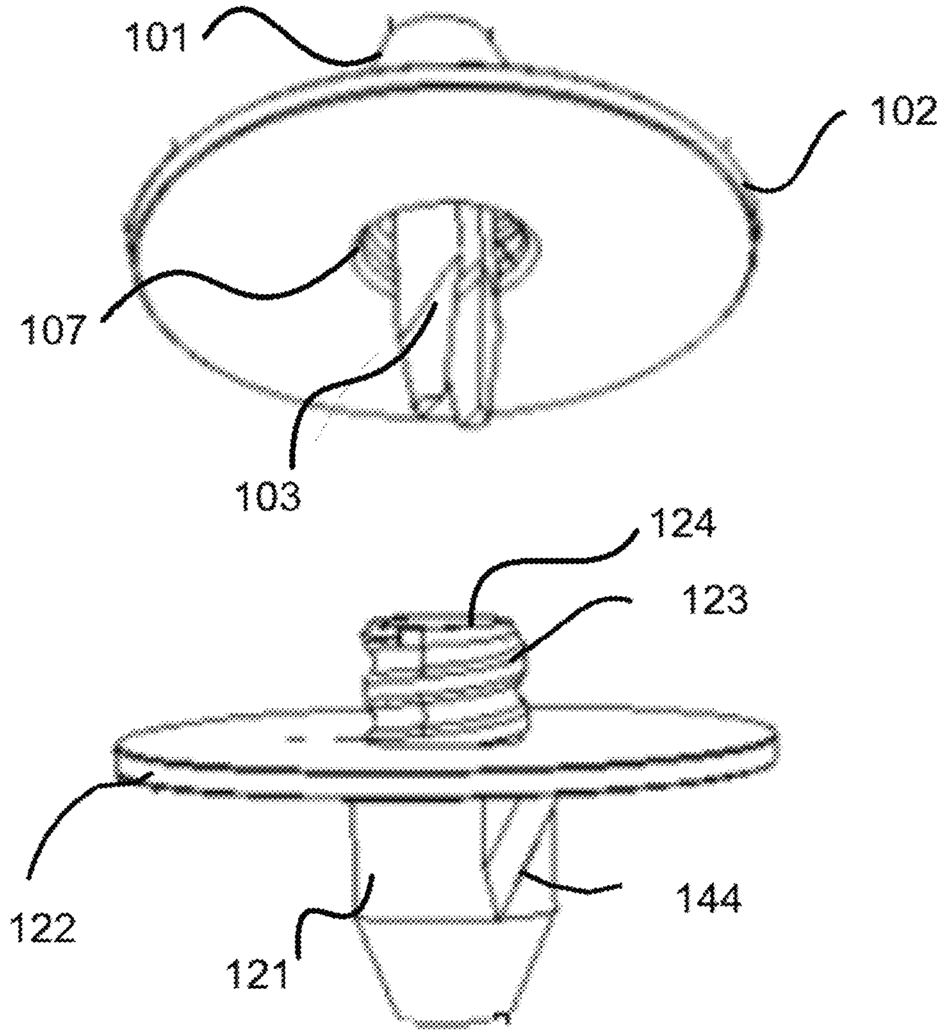
FIG. 7 is a perspective view of the chassis of the line locking float in accordance with subject disclosure.

FIG. 7 provides an exploded perspective view of the centrally located chassis. In various implementations, the first chassis 101 and second chassis 121 may be provided independently without any pre-assembled first housing 105 or second housing 125. As such, any foam bodies 106 or 126 may be attached on the chassis 101 or 121 thereafter, providing an option to customize the housings 105 or 125. The first chassis 101 may comprise a first disc 102 and the second chassis 121 may comprise a second disc 122. When the first chassis 101 is threaded onto the second chassis 121, the first disc 102 may be caused to be flush with the second disc 122, thereby providing a substantially watertight seal between the first chassis 101 and second chassis 121. In various examples, ridges, rings, or patterns may be provided on the first or second surfaces of the first disc 102 and second disc 122, in order to accommodate specific application needs of each user.

In an example, the second portion may comprise a weight 142. The disc-shaped discs may be made of a material that allows the housing bodies 106 126 to attach to the top and bottom chassis for flotation purposes.

Figure 8:
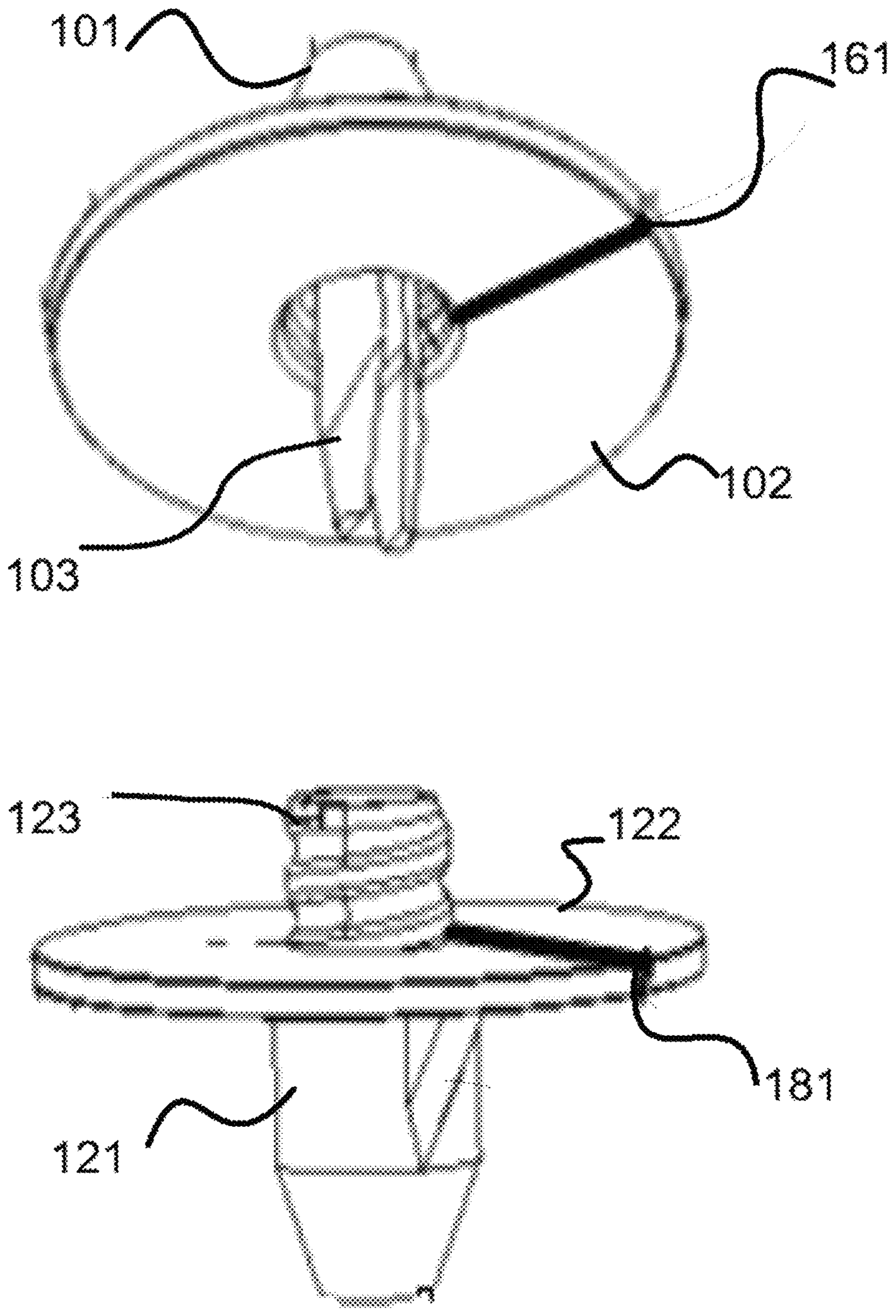
FIG. 8 is a perspective view of an embodiment the chassis of the line locking float with apertures in accordance with subject disclosure.

FIG. 8 provides a similar exploded perspective view to that of FIG. 7 with apertures 161 and 181 included to enable easy slipping onto and off of a fishing line. In this example, the first aperture 161 may be aligned with an aperture on the first housing body 106, and the second aperture 181 may be aligned with an aperture on the second housing body 126. The first aperture 161 may be provided through the first disc 102, and the second aperture 181 may be provided through the second disc 122.

Figure 9:
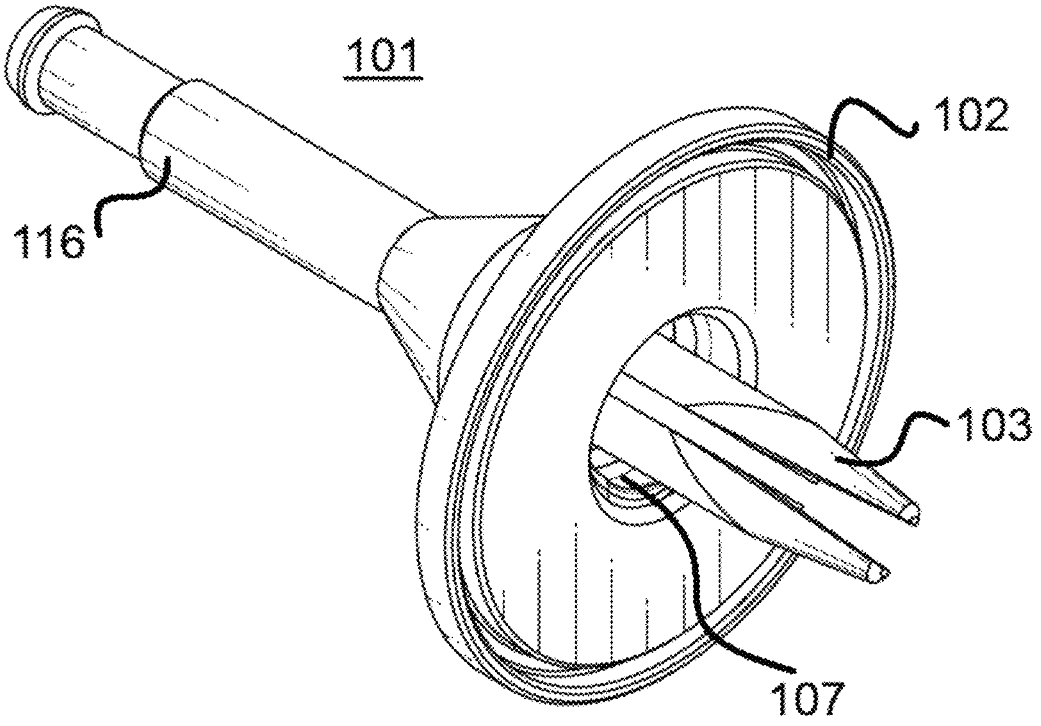
FIG. 9 is a perspective view of a first chassis with a compression member for the line locking float in accordance with subject disclosure.

FIG. 9 provides a perspective view of the first chassis 101 in an example. The first chassis 101 may comprise a first disc 102, which may comprise a groove along its parameter. The first chassis 101 may comprise a tubular portion 116 extending away from the first disc 102, wherein an indent may be provided on the tubular portion 116 to receive a retainer thereon. The first chassis 101 may comprise a cavity 107 within its center, wherein the male compression member 103 may be seated therein. In this example, the cavity may comprise a threaded surface therein.

Figure 10:
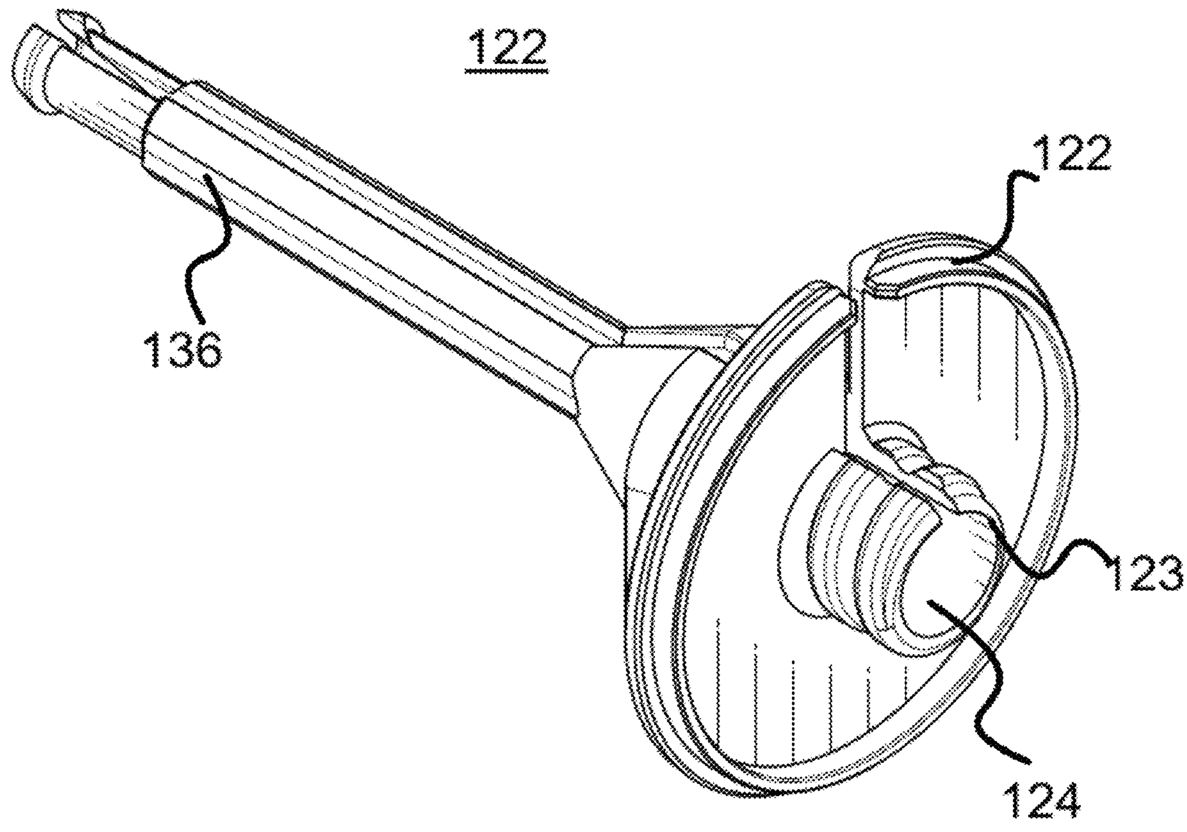
FIG. 10 is a perspective view of a second chassis with a threading member for the line locking float in accordance with subject disclosure.

FIG. 10 provides a perspective view of the second chassis 121 in an example. The second chassis 121 may comprise a second disc 122, which may comprise a ridge along its perimeter. In an example, the ridge may be configured to correspond to the groove on the first housing 101, such that the ridge may fit into the groove when the two chassis are threaded together. The second chassis 121 may comprise a threaded portion 123 that would thread into the cavity 107 on the first housing 101. The second chassis 121 may comprise a tubular portion 136 extending away from the second disc 122, wherein an indent may be provided on the tubular portion 136 to receive a retainer thereon.

Figure 11:
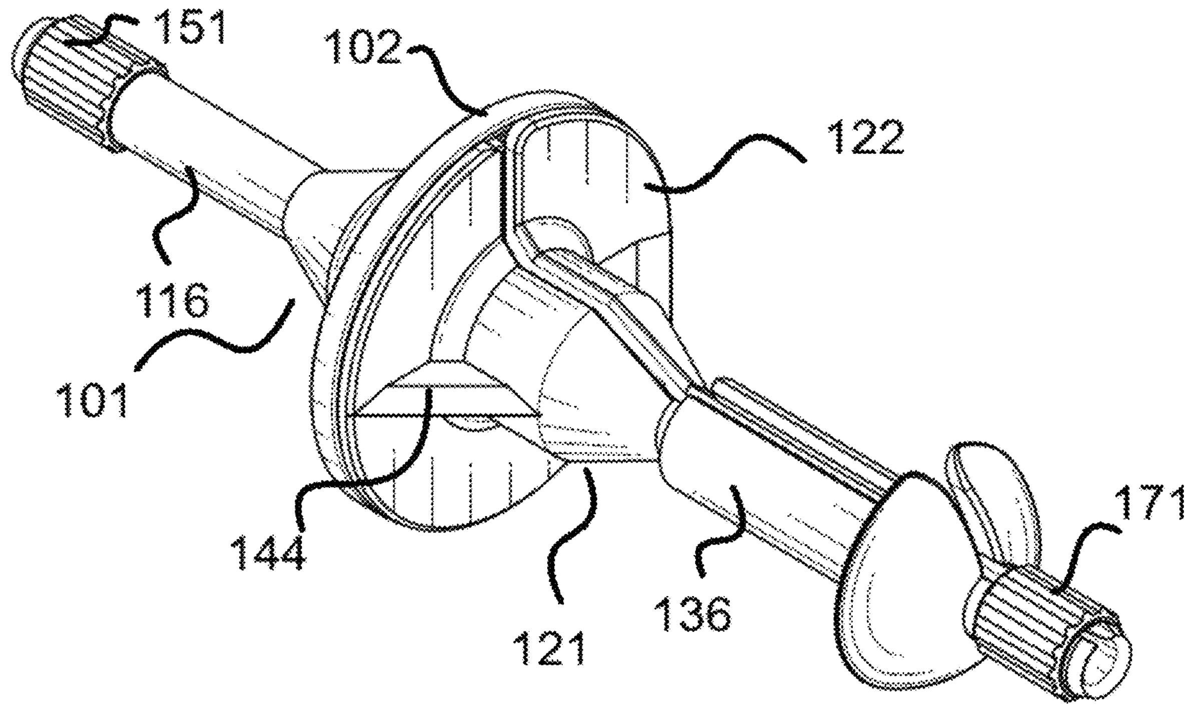
FIG. 11 is a perspective view of a combined first and second chassis for the line locking float in accordance with subject disclosure.

FIG. 11 provides a perspective view of a first chassis 101 and second chassis 121 in a connected configuration. In this example, the first chassis 121 may comprise a tubular portion 116 and the second chassis 121 may comprise another tubular portion 136. The first chassis 101 may comprise a retainer 151 on the distal end of the tubular portion 116 to allow a user to rotate the first chassis 101. Correspondingly, the second chassis 121 may comprise a retainer 171 on the distal end of its tubular portion 136. The first retainer 151 may be rotated around the tubular portion of the chassis 101 in order to close the slots or aperture, thereby keeping the line in the center of the float.

Figure 12:
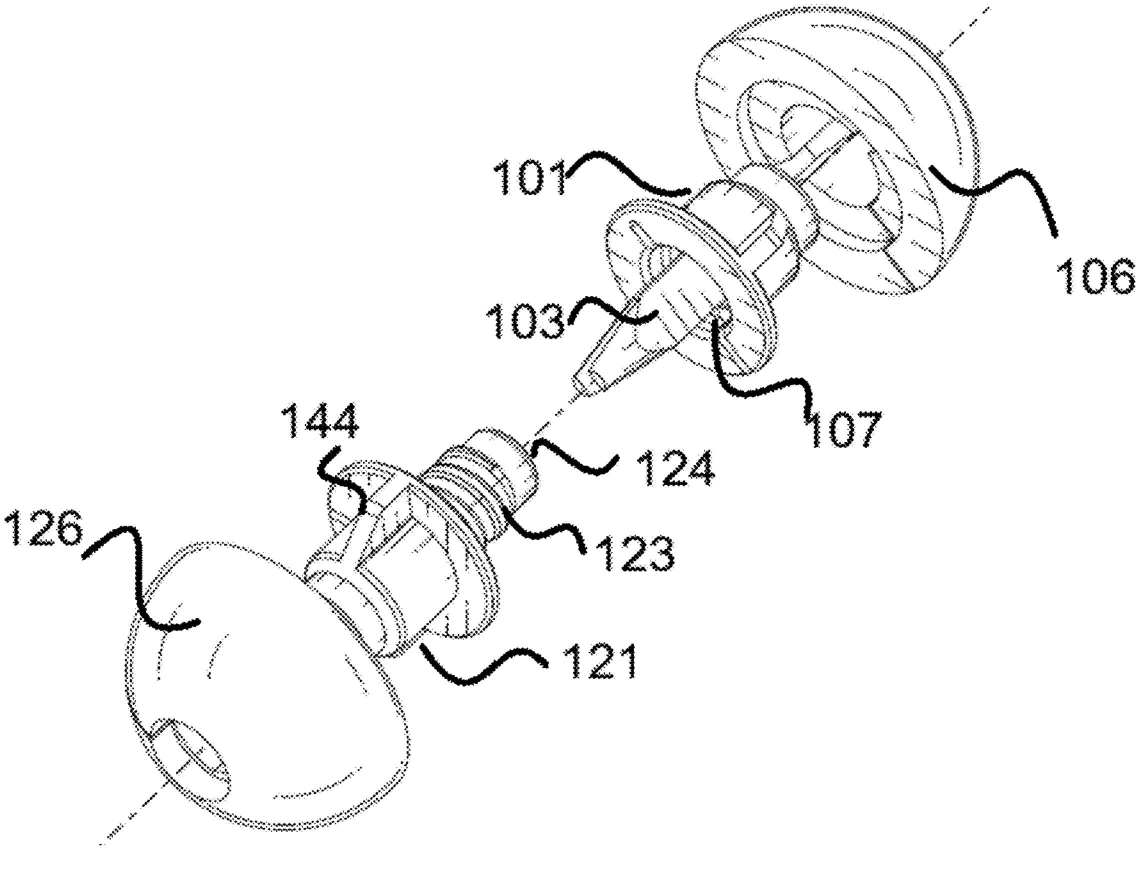
FIG. 12 is an exploded view of an embodiment of the line locking float as a strike indicator in accordance with subject disclosure.

FIG. 12 provides an exploded view of a strike indicator implementation of the line locking float system in accordance with the subject disclosure. The first chassis 101 and the second chassis 121 are aligned in this example in accordance with the preceding description, wherein the compressing member 103 may be inserted into the cavity 124 of the threaded member 123, wherein the threaded member 123 may thread into the first cavity 107. In this example, the first housing 106 is provided as a hemisphere, whereas the second housing 126 may be provided as a second hemisphere. Each of the housings may be attached to the chassis with a fin 144 thereon, such that the housings may rotate the chassis when affixed.

Figure 13:
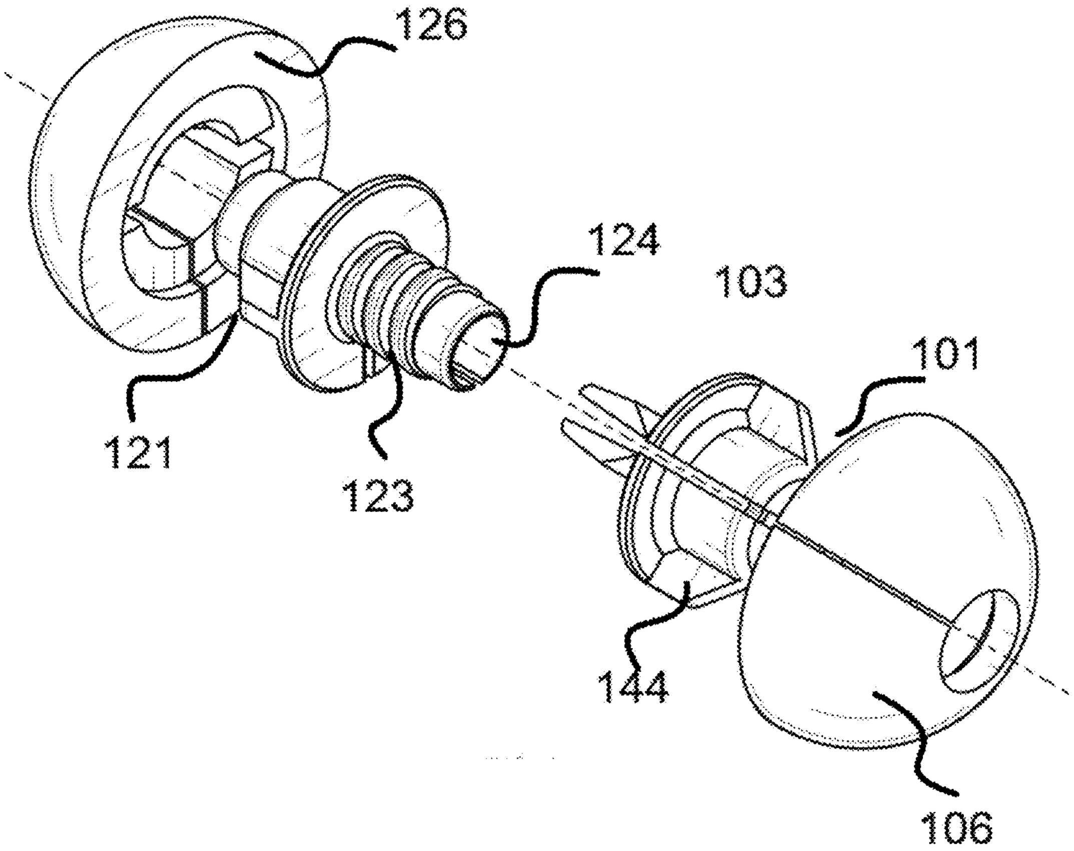
FIG. 13 is another exploded view of an embodiment of the line locking float as a strike indicator in accordance with subject disclosure.

FIG. 13 provides another angle of the exploded view of a strike indicator implementation of the line locking float system in accordance with the subject disclosure. It can be seen in this angle that the compression member 103 may be inserted into the cavity 124, wherein a tapered receptacle may cause the prongs on the compression member 103 to compress when tightened. Thus, when the threading member 123 threads into the cavity 107 on the first chassis 101, the compression member 103 is pushed further into the cavity 124, thereby causing the compression member 103 to close on the fishing line contained within the central passage.

It is envisioned that the chassis construction of the line lock float described and claimed by the present application may enable a user to adapt different geometries for the housings to accommodate application needs. In various examples, the first and second chassis may be provided with or without the elongated tubular portion on each end. Further more, the first and second chassis may be provided with or without the first or second disc. The present invention provides a float system comprising a chassis construction, wherein an first chassis may thread internally into a second chassis, wherein a male compression member may be caused to compress on a fishing line held through a central passage. As such, a plurality of shape and size combinations may be applied to the line lock float. Some of these examples are provided with FIGS. 14-17.

Figure 14:
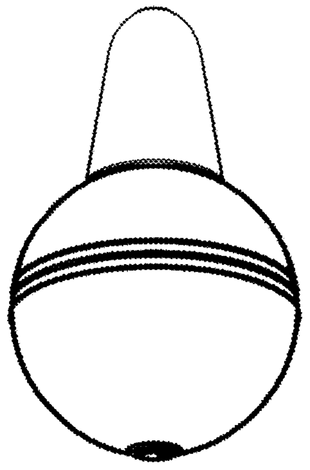
FIG. 14 provides a version of the line lock float wherein the first housing and second housing are modified such that the float may be used as a bobber with tapered top.

FIG. 14 provides a version of the line lock float wherein the first housing and second housing are modified such that the float may be used as a bobber with tapered top.

Figure 15:
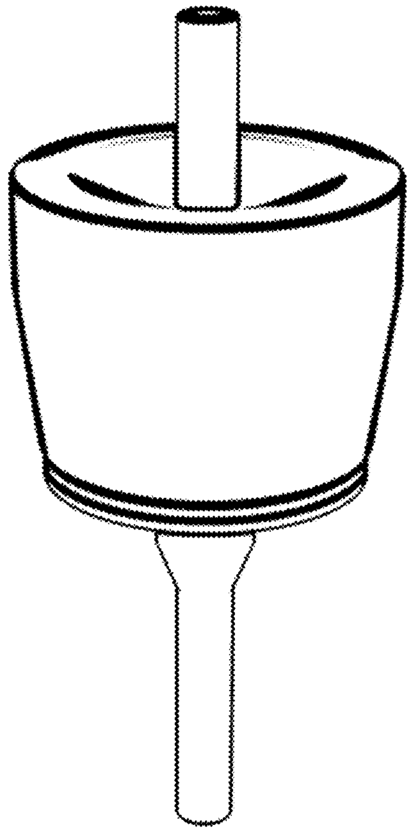
FIG. 15 provides a version of the line lock float wherein the first housing and second housing are modified such that the float may be used as a parasol float.

FIG. 15 provides a version of the line lock float wherein the first housing and second housing are modified such that the float may be used as a parasol float.

Figure 16:
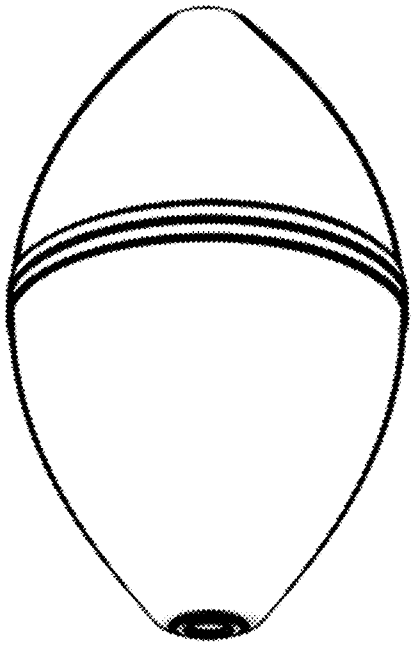
FIG. 16 provides a version of the line lock float wherein the first housing and the second housing are modified such that the float may be used as an oval float.

FIG. 16 provides a version of the line lock float wherein the first housing and the second housing are modified such that the float may be used as an oval float.

Figure 17:
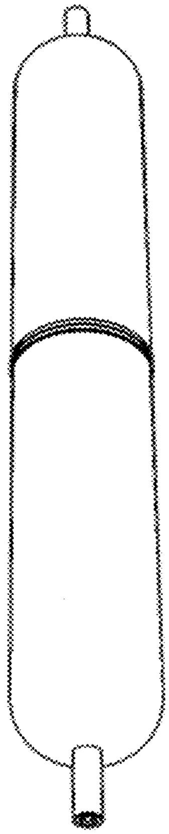
FIG. 17 provides a version of the line lock float wherein the first housing and the second housing are modified such that the float may be used as a stick float.

FIG. 17 provides a version of the line lock float wherein the first housing and the second housing are modified such that the float may be used as a stick float.

Figure 18:
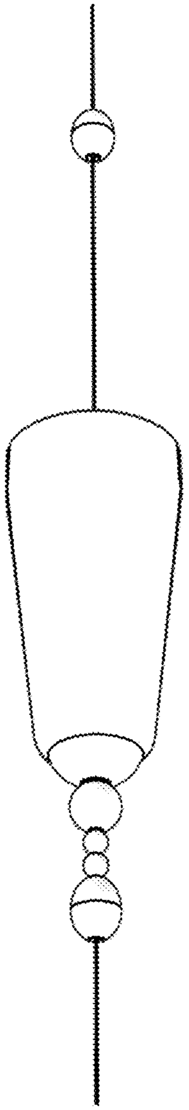
FIG. 18 is a drawing of a pair of line lock float used in connection with a sliding bobber in accordance with subject disclosure.

Further more, a combination of multiple line locking float may be utilized to section off a length of a fishing line, such that an float without a line locking capability may be contained therein by the line locking floats. In FIG. 18, a configuration is shown to provide two line lock floats above and below a float. In this example, each of the line locking floats may be an oval float as shown in FIG. 16. When each of the line locking floats are affixed onto the fishing line, a float may be contained between the two line locking floats therein. As such, the float without a compression member may be free to slide around the fishing line in the length defined by the two line locking floats.

Figure 19:
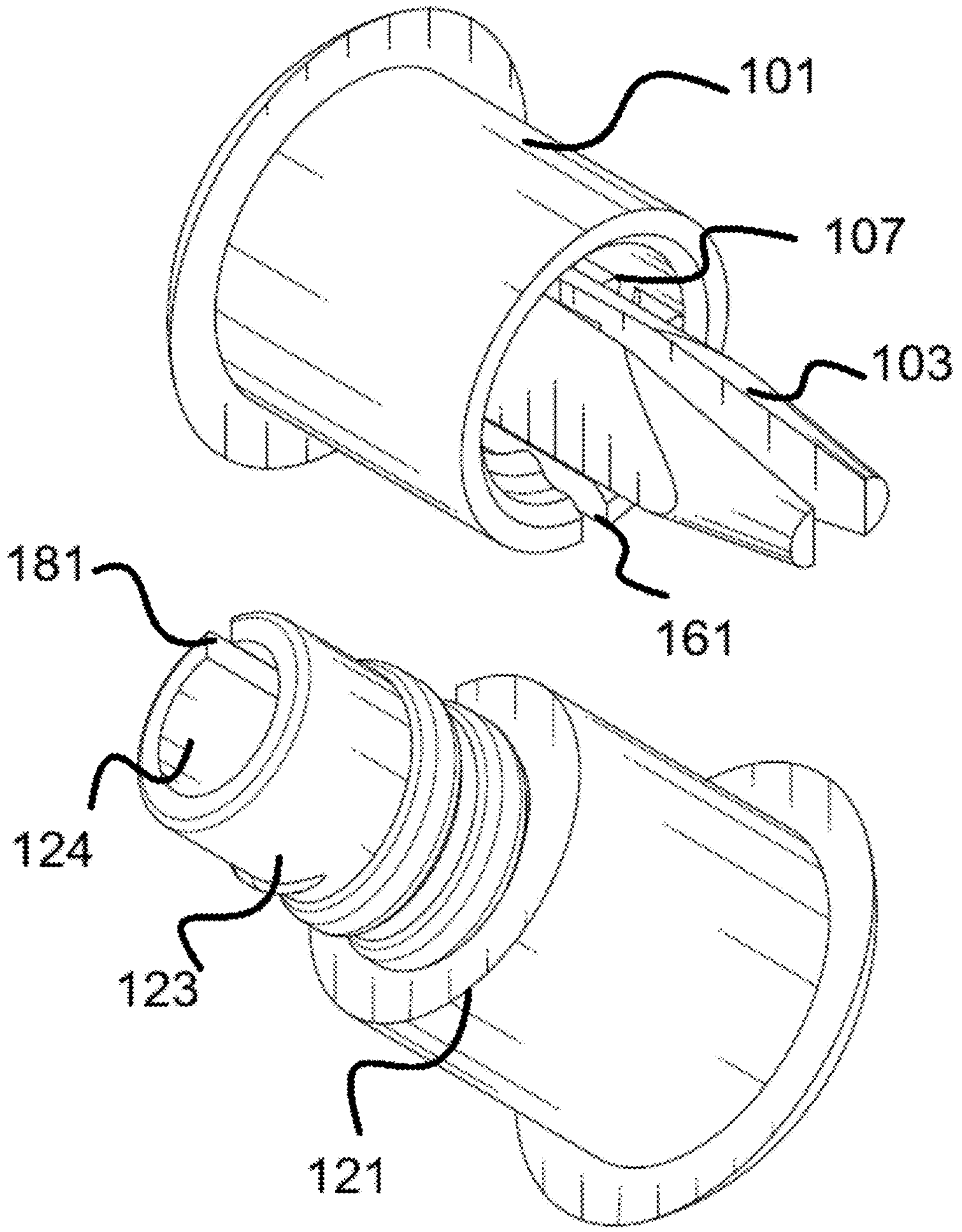
FIG. 19 is a perspective view of another version of the line lock float used in accordance with subject disclosure.

Referring to FIG. 19, another example of the first chassis 101 and second chassis 121 is provided. In this example, the chassis are provided without a pair of discs, such as the first disc 102 and second disc 122 in the preceding figures. This example of the line locking float is still constructed in accordance with the subject disclosure, wherein the first chassis 101 comprises a compression member 103 seated within a cavity 107, and the second chassis 121 comprises a threading member 123 with a second cavity 124. In this example, a first aperture 161 is provided on the first chassis 101 and the a second aperture 181 is provided on the second chassis 121, such that a fishing line may be passed into the central passage of the chassis when both parts have already been assembled.

It should be understood that the foregoing embodiments can be combined or modified without departing from the spirit and scope of the invention. Features described with respect to one embodiment may be incorporated into others. All components identified as "necessary" in one configuration may be replaced by equivalents that provide substantially the same function.

Supported embodiments include a line locking fishing float configured for selective fixation on a fishing line, comprising: first and second chassis components, each with a central passage, threadably coupled to one another in opposite threading directions; a central locking mechanism between the chassis components, the locking mechanism comprising a male component with prongs on the first chassis component received by a female tapered opening on the second chassis component, and at least one exterior buoyant component affixed to the chassis components, wherein the locking mechanism compresses a portion of the fishing line to lock the float relative to the line when actuated by the coupling, and the fishing line is secured by the locking mechanism through the central passage.

Supported embodiments include a line locking fishing float configured for selective fixation on a fishing line, wherein at least one interior prong surface carrying a rubber or rubber-like coating to increase friction.

Supported embodiments include a line locking fishing float configured for selective fixation on a fishing line, wherein the first and second internal chassis components each comprise substantially flat discs arranged to oppose one another when threadably coupled.

Supported embodiments include a line locking fishing float configured for selective fixation on a fishing line, wherein the first and second chassis components each include substantially flat discs with a corresponding ridge and groove arranged to oppose one another when threadably coupled.

Supported embodiments include a line locking fishing float configured for selective fixation on a fishing line, wherein the first and second chassis components comprises a fin, wherein the at least exterior buoyant comprises an indentation to receive the fin to inhibit relative rotation.

Supported embodiments include a line locking fishing float configured for selective fixation on a fishing line, wherein the first and second chassis components comprise an aperture that extends to the central passage, such that the fishing line may enter into the central passage through the aperture.

Supported embodiments include a line locking fishing float configured for selective fixation on a fishing line, wherein the tapered compressing closing section and the tapered receiving opening extend to or near an end of the float to reduce an opportunity for lateral line exit.

Supported embodiments include a line locking fishing float configured for selective fixation on a fishing line, further comprising at least one weight selected from an internal weight embedded within the buoyant component and an external weight affixed to the float's exterior, the external weight optionally contoured to affect movement in water.

Supported embodiments include a line locking fishing float configured for selective fixation on a fishing line, comprising a first chassis component with a first body with a cavity, wherein a compressing male component with prongs sits within a first cavity, a second chassis component with second body with a threading component, wherein the threading component comprises a tapered female receptacle therein, and at least one exterior buoyant component affixed to the chassis components, wherein the fishing line passes through a central passage formed by the first chassis component and the second chassis component, the first chassis component is threadably attached to the second chassis component when the threading component threads into the first cavity, and the tapered female receptacle closes the prongs and causes the compressing male component secure the line passing through the central passage.

Supported embodiments include a line locking fishing float configured for selective fixation on a fishing line, wherein at least one interior prong surface carrying a rubber or rubber-like coating to increase friction.

Supported embodiments include a line locking fishing float configured for selective fixation on a fishing line, wherein the first and second internal chassis components each comprise substantially flat discs arranged to oppose one another when threadably coupled.

Supported embodiments include a line locking fishing float configured for selective fixation on a fishing line, wherein the first and second chassis components each include substantially flat discs with a corresponding ridge and groove arranged to oppose one another when threadably coupled.

Supported embodiments include a line locking fishing float configured for selective fixation on a fishing line, wherein the first and second chassis components comprises a fin, wherein the at least exterior buoyant comprises an indentation to receive the fin to inhibit relative rotation.

Supported embodiments include a line locking fishing float configured for selective fixation on a fishing line, wherein the first and second chassis components comprise an aperture that extends to the central passage, such that the fishing line may enter into the central passage through the aperture.

Supported embodiments include a line locking fishing float configured for selective fixation on a fishing line, wherein the tapered compressing closing section and the tapered receiving opening extend to or near an end of the float to reduce an opportunity for lateral line exit.

Supported embodiments include a line locking fishing float configured for selective fixation on a fishing line, further comprising at least one weight selected from an internal weight embedded within the buoyant component and an external weight affixed to an exterior, the external weight optionally contoured to affect movement in water.

Supported embodiments include a line locking fishing float configured for selective fixation on a fishing line, comprising a first slotted chassis component a compressing male component with prongs sits within a first cavity, a second slotted chassis component a tapered receptacle therein, and at least one exterior buoyant component affixed to the chassis components, wherein the fishing line passes through an apertured formed by the first slotted chassis component and the second slotted chassis component into a central passage, and the tapered f receptacle closes the prongs and causes the compressing male component when the slotted chassis components threadably attach to secure the line passing through the central passage.

Supported embodiments include a line locking fishing float configured for selective fixation on a fishing line, wherein the first and second chassis components comprises a fin, wherein the at least exterior buoyant comprises an indentation to receive the fin to inhibit relative rotation.

Supported embodiments include a line locking fishing float configured for selective fixation on a fishing line, wherein the tapered compressing closing section and the tapered receiving opening extend to or near an end of the float to reduce an opportunity for lateral line exit.

Supported embodiments include a line locking fishing float configured for selective fixation on a fishing line, further comprising at least one weight selected from an internal weight embedded within the buoyant component and an external weight affixed to an exterior, the external weight optionally contoured to affect movement in water.

The detailed description provided above in connection with the appended drawings is intended as a description of examples and is not intended to represent the only forms in which the present examples can be constructed or utilized.

It is to be understood that the configurations and/or approaches described herein are exemplary in nature, and that the described embodiments, implementations and/or examples are not to be considered in a limiting sense, because numerous variations are possible.

The specific processes or methods described herein can represent one or more of any number of processing strategies. As such, various operations illustrated and/or described can be performed in the sequence illustrated and/or described, in other sequences, in parallel, or omitted. Likewise, the order of the above-described processes can be changed.

Although the subject matter has been described in language specific to structural features and/or methodological acts, it is to be understood that the subject matter defined in the appended claims is not necessarily limited to the specific features or acts described above. Rather, the specific features and acts described above are presented as example forms of implementing the claims.

What is claimed is:

1. A line locking fishing device configured for selective fixation on a fishing line, comprising:

first and second chassis components, each with a central passage, threadably coupled to one another in opposite threading directions, wherein the first and second chassis components each comprise substantially flat discs arranged to oppose one another when threadably coupled, the substantially flat discs each including a corresponding ridge and groove arranged to oppose one another when threadably coupled, a central locking mechanism between the chassis components, the locking mechanism comprising a male component with prongs on the first chassis component received by a female tapered opening on the second chassis component, and at least one exterior buoyant component affixed to the chassis components, wherein the locking mechanism compresses a portion of the fishing line to lock the float relative to the line when actuated by the coupling, and the fishing line is secured by the locking mechanism through the central passage.

2. The line locking fishing device of claim 1, wherein at least one interior prong surface carrying a rubber or rubber-like coating to increase friction.

3. The line locking fishing device of claim 1, wherein the first and second chassis components comprises at least one fin, wherein the at least exterior buoyant comprises an indentation to receive the at least one fin to inhibit relative rotation.

4. The line locking fishing device of claim 1, wherein the first and second chassis components comprise an aperture that extends to the central passage, such that the fishing line may enter into the central passage through the aperture.

5. The line locking fishing device of claim 1, wherein the tapered compressing closing section and the tapered receiving opening extend to or near an end of the float to reduce an opportunity for lateral line exit.

6. The line locking fishing device of claim 1, further comprising at least one weight selected from an internal weight embedded within the buoyant component and an external weight affixed to an exterior, the external weight optionally contoured to affect movement in water.

7. A line locking fishing device configured for selective fixation on a fishing line, comprising:

a first chassis component with a first body with a cavity, wherein a compressing male component with prongs sits within a first cavity, wherein the first chassis component comprises a substantially flat first disc, a second chassis component with second body with a threading component, wherein the threading component comprises a tapered receptacle therein, wherein the second chassis component comprises a substantially flat second disc, the first and second discs arranged to oppose one another when threadably coupled and each including a corresponding ridge and groove, and at least one exterior buoyant component affixed to the chassis components, wherein the fishing line passes through a central passage formed by the first chassis component and the second chassis component, the first chassis component is threadably attached to the second chassis component when the threading component threads into the first cavity, and the tapered receptacle closes the prongs and causes the compressing male component secure the line passing through the central passage.

8. The line locking fishing device of claim 7, wherein at least one interior prong surface carrying a rubber or rubber-like coating to increase friction.

9. The line locking fishing device of claim 7, wherein the first and second chassis components comprises at least one fin, wherein the at least exterior buoyant comprises an indentation to receive the at least one fin to inhibit relative rotation.

10. The line locking fishing device of claim 7, wherein the first and second chassis components comprise an aperture that extends to the central passage, such that the fishing line may enter into the central passage through the aperture.

11. The line locking fishing device of claim 7, wherein the prongs and the tapered receptacle extend to or near an end of the float to reduce an opportunity for lateral line exit.

12. The line locking fishing device of claim 7, further comprising at least one weight selected from an internal weight embedded within the buoyant component and an external weight affixed to an exterior, the external weight optionally contoured to affect movement in water.

13. A line locking fishing device configured for selective fixation on a fishing line, comprising:

a first slotted chassis component comprising a compressing component with prongs sits within a first cavity, wherein the first slotted chassis component comprises at least one fin, a second slotted chassis component comprising a tapered receptacle therein, wherein the second slotted chassis component comprises at least one fin, and at least one exterior buoyant component affixed to the chassis components, wherein the at least one exterior buoyant component comprises an indentation to receive the at least one fin to inhibit relative rotation, wherein the fishing line passes through an apertured formed by the first slotted chassis component and the second slotted chassis component into a central passage, and the tapered receptacle closes the prongs and causes the compressing male component when the slotted chassis components threadably attach to secure the line passing through the central passage.

14. The line locking fishing device of claim 13, wherein the prongs and the tapered receptacles extend to or near an end of the float to reduce an opportunity for lateral line exit.

15. The line locking fishing device of claim 13, further comprising at least one weight selected from an internal weight embedded within the buoyant component and an external weight affixed to an exterior, the external weight optionally contoured to affect movement in water.

* * * * *